F. RIETHOF.
PROCESS OF PRODUCING ALDEHYDE SULFOXYLATES.
APPLICATION FILED MAY 20, 1910.
1,006,793.
Patented Oct. 24, 1911.
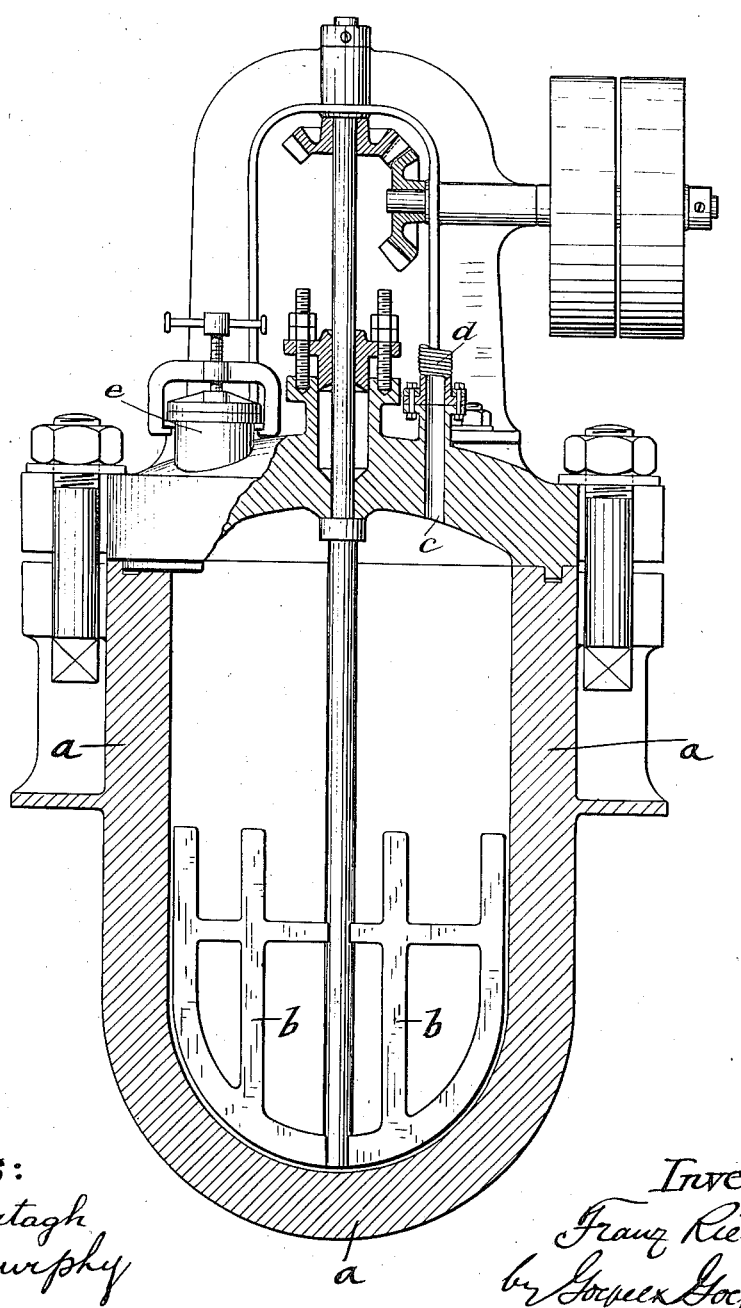
Witnesses:
John Murtagh
L. J. Murphy
Inventor:
Franz Riethof
by Goepel & Goepel
Attorneys

UNITED STATES PATENT OFFICE.

FRANZ RIETHOF, OF TEPLITZ-THURN, AUSTRIA-HUNGARY, ASSIGNOR TO THE FIRM OF BLUMBERG & RINDSKOPF, OF ZUCKMANTEL, NEAR TEPLITZ, AUSTRIA-HUNGARY.

PROCESS OF PRODUCING ALDEHYDE SULFOXYLATES.

1,006,793.  Specification of Letters Patent.  Patented Oct. 24, 1911.

Application filed May 20, 1910. Serial No. 562,352.

*To all whom it may concern:*

Be it known that I, FRANZ RIETHOF, a citizen of the Austro-Hungarian Empire, and residing at Teplitz-Thurn, in said Empire of Austria-Hungary, have invented certain new and useful Improvements in Processes of Producing Aldehyde Sulfoxylates, of which the following is a specification.

The formation of formaldehyde sulphoxylic acid salts by the action of zinc dust on a solution of formaldehyde bisulfite in water is effected, as is well known, only but in an incomplete degree at normal temperature without the aid of heat. Better results are obtained by the process according to the German Patent No. 202242 in which process formaldehyde, bisulfite and zinc dust are permitted to react upon each other at boiling heat, for which purpose they are either boiled for several hours, or heated for a longer time at a lower temperature.

According to the present invention it is possible to complete this reaction in a much quicker, simpler and more rational manner without any external heating, by permitting formaldehyde bisulfite and zinc dust to react upon each other under pressure, preferably in the presence of inactive or reducing gases, in which case the heat due to the reaction itself suffices, together with a corresponding pressure, to complete the reaction in a shorter period than is the case with the application of boiling heat at normal pressure. In general the greater the pressure applied, the more rapidly the reaction is effected. It is possible in this manner to obtain the reaction without external heating and in a far shorter time than has been possible hitherto, and yet to obtain an equally good product.

The accompanying drawing shows one form of apparatus in which the improved process of producing aldehyde-sulfoxylates may be carried out.

It is self evident that in place of zinc dust, iron powder or any other metallic reducing agent of equal value may be used. Similarly, instead of formaldehyde, benzaldehyde or any other saturated aldehyde may be used.

For the preparation of sodium aldehyde-sulfoxylates, it is possible to start with sodium bisulfite, and then evaporating, preferably in a vacuum, the solution which is obtained after the completion of the reaction and which has been filtered to remove the zinc-sludge; or it is also possible to start with another bisulfite salt, for instance zinc bisulfite, in which case it is necessary to change the somewhat insoluble aldehyde-zinc sulfoxylate which is first obtained, by adding soda or the like. The following equation illustrates this reaction:

$$NaHSO_3 + CH_2O + Zn + 3H_2O = CH_2O \cdot NaHSO_2 \cdot 2H_2O + Zn(OH)_2.$$

Example: 100 parts of sodium bisulfite solution at 38° Be. are mixed in a digester $a$ provided with a stirring arrangement $b$, as shown in the drawing, with 25 parts of 40% formaldehyde and 50 parts of zinc dust. Carbonic acid or other gas is then introduced through the opening $c$ or otherwise and after the air has been displaced this mixture is submitted to a pressure of 6–8 atmospheres. A pipe $d$ from a proper source of supply may be connected with said opening $c$ for introducing said gas and said gas may be under regulable pressure at its source of supply whereby the required pressure may be obtained in the digester. The digester is provided with a man-hole $e$ for introducing the reagent. The result of the mixing of the bisulfite solution and of the formaldehyde is a gradual rise of temperature of about 25°–30°. By a simultaneous mixing of bisulfite solution with formaldehyde and zinc dust, the temperature of the mixture rises about 45°–50°.

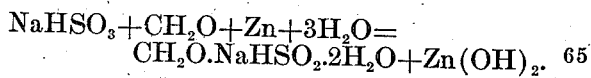

With the pressure stated above the reaction is effected without any application of heat in less than an hour. In a series of trials, the filtrate of the reaction mixture showed a reduction-value of 95–97 after a treatment lasting 20 minutes at a pressure of 6 atmospheres, as compared with a reduction value of 23, when the same mixture was stirred for two hours in an open vessel without pressure. In the above comparison the filtrate obtained according to the German Patent No. 202242 by boiling the mixture for two hours is taken as 100. The subsequent treatment of the product of reaction obtained by the new process is effected in the usual well-known manner.

I claim:

1. The process herein described of producing aldehyde-sulfoxylates which consists in mixing together a metallic reducing medium, an aldehyde, a bisulfite and water and in causing these substances to react upon each other under pressure.

2. The process herein described of producing aldehyde-sulfoxylates which consists in mixing together a metallic reducing medium, an aldehyde, a bisulfite and water and in causing these substances to react upon each other under pressure in the presence of gases that prevent the oxidation of the products.

3. The process herein described of producing sodium aldehyde-sulfoxylates, which consists in mixing together zinc dust, formaldehyde, sodium bisulfite and water, and in causing these substances to react upon each other under pressure.

4. The process herein described of producing sodium aldehyde-sulfoxylates, which consists in mixing together zinc dust, formaldehyde, sodium bisulfite and water, and in causing these substances to react upon each other under pressure in the presence of gases that prevent the oxidation of the products.

In testimony, that I claim the foregoing as my invention, I have signed my name in presence of two subscribing witnesses.

FRANZ RIETHOF.

Witnesses:
ADOLPHE FISCHER,
H. H. S. BATE.